US010086662B2

(12) United States Patent
Graf et al.

(10) Patent No.: US 10,086,662 B2
(45) Date of Patent: Oct. 2, 2018

(54) DEVICE AND METHOD FOR DETECTING A PRESSURE CHANGE IN A TIRE USING A PLURALITY OF TEMPERATURE SIGNALS

(71) Applicant: Aktiebolaget SKF, Gothenburg (SE)

(72) Inventors: Jens Graf, Schweinfurt (DE); Milen Kourtev, Säve (SE)

(73) Assignee: AKTIEBOLAGET SKF, Gothenburg (SE)

( * ) Notice: Subject to any disclaimer, the term of this patent is extended or adjusted under 35 U.S.C. 154(b) by 30 days.

(21) Appl. No.: 15/704,585

(22) Filed: Sep. 14, 2017

(65) Prior Publication Data

US 2018/0015792 A1  Jan. 18, 2018

Related U.S. Application Data

(62) Division of application No. 14/503,956, filed on Oct. 1, 2014, now Pat. No. 9,796,220.

(30) Foreign Application Priority Data

Oct. 1, 2013  (DE) .................. 10 2013 219 849

(51) Int. Cl.
*G08B 21/00* (2006.01)
*B60C 23/04* (2006.01)

(52) U.S. Cl.
CPC ................. *B60C 23/0476* (2013.01)

(58) Field of Classification Search
CPC .................. B60C 23/0476; B60C 23/00
USPC ............... 340/442, 443, 449; 73/146, 146.2; 702/98, 99, 138
See application file for complete search history.

(56) References Cited

U.S. PATENT DOCUMENTS

| 4,723,445 | A | 2/1988 | Ripley et al. |
| 6,838,983 | B1* | 1/2005 | Wong ............... G01L 17/00 |
| | | | 152/415 |
| 7,502,704 | B2 | 3/2009 | Burghardt et al. |
| 8,606,535 | B2 | 12/2013 | Hafele et al. |

(Continued)

FOREIGN PATENT DOCUMENTS

| DE | 10360122 A1 | 7/2005 |
| DE | 102005045687 A1 | 9/2005 |
| DE | 102011006646 A1 | 10/2012 |

*Primary Examiner* — Toan N Pham
(74) *Attorney, Agent, or Firm* — Bryan Peckjian; SKF USA Inc. Patent Dept.

(57) ABSTRACT

A device for detecting a pressure change in a tire includes a first temperature sensor located outside the tire being configured to produce a first temperature signal indicative of a first temperature, an input apparatus configured to receive the first temperature signal from the first temperatures sensor, and to receive a second temperature signal from a second temperature sensor being indicative of a second temperature, and to receive a tire pressure signal from a tire pressure sensor being indicative of a tire pressure of the tire, and a processor configured to output an evaluation signal including information about a change of tire pressure based on the pressure signal and based on the first temperature signal and the second temperature signal. The processor is configured to evaluate the pressure signal only if a temperature difference between the first temperature and the second temperature is smaller than a predefined limit value.

3 Claims, 3 Drawing Sheets

(56) References Cited

U.S. PATENT DOCUMENTS

2006/0187013 A1 8/2006 Jost
2012/0214931 A1 10/2012 Schumacher et al.

* cited by examiner

DEVICE AND METHOD FOR DETECTING A PRESSURE CHANGE IN A TIRE USING A PLURALITY OF TEMPERATURE SIGNALS

CROSS-REFERENCE TO RELATED APPLICATION

This application is a divisional of U.S. patent application Ser. No. 14/503,956, filed on Oct. 1, 2014, which claims priority to German patent application no. 10 2013 219 849.3, filed on Oct. 1, 2013, the contents of which are fully incorporated herein by reference.

TECHNOLOGICAL FIELD

Exemplary embodiments relate to a device and a method for detecting a pressure change in a tire based in part on first and second temperature measurements.

BACKGROUND

It is often desirable to check the pressure of a tire, for example, in order to determine if the pressure in the tire has changed. Pressure changes in a tire sometimes occur due to so-called slow leakage. In a slow leak, a relatively small amount of air escapes over a relatively long period of time, possibly unnoticed by a driver. Such a leak usually does not lead directly to a flat tire or a functional failure of the tire, but operating a tire outside an optimal pressure range can, under some circumstances, negatively affect tire reliability, durability, and abrasion resistance, and can also negatively affect fuel consumption, driving comfort, and/or driving performance.

Systems are known for monitoring tire pressure. For example, systems are known that measure the pressure in two tires on one axle of a vehicle (of a truck, for example), and that compare the pressures to each other. This allows a leak in one of the tires to be detected, but equivalent pressure changes occurring simultaneously in both tires cannot be detected.

SUMMARY

There is therefore a need to improve a device and a method for detecting a pressure change in a tire. This need is met by embodiments of the present disclosure.

Exemplary embodiments are directed to a device for detecting a pressure change in a tire. The device comprises an input apparatus that is configured to receive a first temperature signal including information about a first temperature and a second temperature signal including information about a second temperature. The input apparatus is also configured to receive a pressure signal that includes information about a pressure of the tire. The device also comprises a processor configured evaluate the information about the pressure of the tire in light of a comparison of the information about the first and second temperatures and to generate an evaluation signal based on this evaluation. The evaluation signal includes information about a pressure change in the tire. The device also comprises an output apparatus configured to provide or output the evaluation signal. The first temperature signal is generated by a first temperature sensor which is located outside the tire.

Since the information about the pressure of the tire results from a comparison of information about the first and second temperatures, an improved device for detecting a pressure change in a tire can be provided. Such an improvement is possible because the system takes into account various influences on tire pressure, such as, for example, a temperature or an operating state of the tire, when evaluating the tire pressure. The temperature of a tire, or the temperature of a medium in a tire, can be influenced by factors internal or external to the system (system-internal and/or system-external factors). System-internal factors may comprise, for example heat generated by braking or heat generated by flexing of the tire which can occur during the rolling of the tire, especially at high speeds. System-external factors may comprise, for example, the ambient temperature. Furthermore, since the first temperature sensor is disposed (mounted) outside the tire, it can be maintained and/or exchanged in a simple manner and/or is not exposed to the pressure conditions in the tire.

In other words, using the device of the present disclosure or a system which comprises the device of the present disclosure, it is possible to detect slow leakage or a small pressure change of a tire. This is made possible by detecting factors other than leakage that cause pressure changes in the tire and not indicating a leak when a pressure change can adequately be explained by these other factors. If a leak is detected, a user or a driver can be warned or informed about the state of the tire. Such a warning being provided, for example, by a display or other output in a vehicle cockpit Conventional tire pressure monitoring systems may provide an alarm once a predetermined tire pressure is reached. Thus, for example, the pressure of a tire that nominally operates at 35 psi may vary by several psi up or down under normal use. However, if that tire develops a slow leak and loses 0.5 psi per day, for example, it may take 10 days before the pressure drops to 30 psi and a low pressure condition is indicated. The present disclosure allows a slow leak to be detected and information about the slow leak to be provided before the leak reduces tire pressure to a sub-optimal level.

The pressure (internal pressure) in a tire or other component may be over or under an optimal range, and overpressures can be detected according to the present disclosure as well as under pressures. Absolute pressures can be detected as well as pressure relative to an ambient pressure of a medium surrounding the component. The medium in the component or the tire can be any fluid, for example a gas, air, liquefied petroleum gas, liquid, etc.

In some further exemplary embodiments a processor is provided for evaluating the pressure signal at times when the temperature difference between the first temperature and the second temperature is smaller than a predefined limit value. Thus, for example, it becomes possible to measure tire pressure only when the tire is in a so-called optimum measuring state for measuring its pressure. This optimum measuring state may be a cold state or close-to-cold state of the tire. In the optimum measuring state, the tire or the medium has substantially the same temperature as the ambient temperature of the environment in which the tire is located. The temperature difference between the first temperature and the second temperature can, for example, fall in a range between about 0° and 5°. Under certain circumstances it can be concluded from the temperature difference that the tire temperature is close to or similar to the ambient temperature, and that the tire is in a so-called optimum measuring state since the tire pressure (e.g. air pressure) is not increased by an increased temperature which the tire has in comparison to the ambient temperature. In other words pressure measuring may only be commenced when the tire has cooled down to or near to ambient temperature.

For example, the processor can be configured to generate an output signal that contains a request for a pressure sensor to carry out a pressure measurement only after a comparison of the first temperature and the second temperature finds that their difference falls within the predefined range or that they are both substantially the same. The output apparatus can be configured to issue this output signal including the information about the request to carry out a pressure measurement. As a result, the input apparatus can receive a corresponding pressure signal, for example from a pressure sensor. Additionally or alternatively the output device can be formed to provide the output signal, including the request to receive a pressure signal, to the input apparatus. The output apparatus can thereupon, for example, receive the pressure signal.

In some further exemplary embodiments the input apparatus is formed to receive a state signal indicative of the operating state of the tire—whether the tire is moving or stopped. The processor can be configured to evaluate the pressure signal if the state signal indicates a stoppage of the tire. Furthermore, the input apparatus can be configured to receive the pressure signal after a predetermined time interval following reception of the state signal. In this way it can be ensured, for example, that the pressure measurement is only started if the tire is stationary and, if necessary, has cooled down. Since the pressure measurement can take place in a stationary state of the tire, it can be ensured that the measurement takes place under defined temperature- and/or pressure-measuring conditions. For example, an influence on the pressure- and/or temperature-measuring caused by braking, shock-like or impulsive loads, impact stress, the occurrence of asymmetrical loads, undefined load situations, for example due to shifting of loads during travel or the uneven loading of a tire of an axle during cornering, can optionally be reduced or even eliminated. Furthermore, it may be possible to detect a leakage during stoppage and not only during driving or during operation of the tire. A warning can therefore be issued to a driver at the start of travel. For example, a warning can appear when a vehicle is started. Since the pressure- and temperature-measurement is carried out when the vehicle is stationary, a warning or information about a pressure change of the tire can be generated, for example in a maintenance system (e.g. a TPMS or tire pressure monitoring system). This may be possible even if a tire air temperature is not known.

Furthermore, waiting a certain time interval after the tire stops moving before taking a pressure measurement helps ensure that the tire has had a sufficient time to cool down. For example, single tires may require half an hour to cool down, while dual or twin tires may require an hour. In other words, the pressure measurement takes place when the tire or a vehicle is stationary, and only after the tire has stopped moving for a long enough time interval following stoppage to allow it to cool to or near to an ambient temperature.

In some exemplary embodiments, measuring the pressure or receiving the pressure signal occurs only after the predetermined time interval and only if the temperature difference between the first and second temperature falls within certain limits. In this way it can be assumed with increased certainty that the tire is in a proper pressure measurement state—a state in which a precise pressure measurement can be taken. Measurement errors caused, for example, by direct sunlight on the ambient temperature sensor, can optionally be reduced in this way. Reducing such measurement errors and influences makes it easier to reliably detect small temperature changes.

In some further exemplary embodiments, the measurement of the first temperature and the measurement of the second temperature or the receiving of the first temperature signal and the receiving of the second temperature signal can take place only when the input apparatus has received a state signal which includes information about an operating of the tire, e.g., whether it is rolling or stopped. It can thus be ensured that the temperature measurement only occurs when the tire is stationary and no further heating of the tire, for example due to braking or flexing, is to be expected.

In some exemplary embodiments the device comprises an acceleration sensor which is configured and disposed to generate the state signal. In some exemplary embodiments, a state signal which includes information about vehicle stoppage or tire movement can thus be generated independently of an ignition system or a sensor of the ABS system. An acceleration sensor can be, for example, a MEMS sensor which under certain circumstances can detect a tangential acceleration and/or a radial acceleration. The acceleration sensor can be disposed on the wheel, but does not necessary need to be disposed on or in the tire. For example, the acceleration sensor can be attached to a plate which is attached to the rim on the wheel hub.

In some further exemplary embodiments the device comprises a pressure sensor configured to generate the pressure signal. The pressure sensor may be disposed in the tire or in a region in which pressure is increased relative to an ambient pressure, on the valve or in the valve stem of the tire, for example. In other words, the receiving apparatus can be formed to receive a pressure signal which is generated by a pressure sensor disposed in the tire. Disposing the pressure sensor on a valve of the tire may also simplify the installation of the pressure sensor. In contrast to a pressure sensor which is disposed inside a tire, a sensor on a valve or in a valve stem may advantageously be subjected to smaller loads, and this may increase the service life of the pressure sensor.

In some further exemplary embodiments, the first temperature signal and the second temperature signal are generated or provided by different sensors. Such an embodiment allows actual tire temperature and ambient tire temperature to be compared. A tire temperature can, for example, be measured in an interior of the tire or in the fluid in the tire. Meanwhile, the second temperature signal can be provided by a temperature sensor of a vehicle control system. However, it is also possible that the device includes only a single temperature sensor.

In some further exemplary embodiments, the device comprises a temperature sensor, sometimes referred to hereinafter as a first temperature sensor. The first temperature sensor may be configured to generate the first temperature signal and may be disposed on or in or near or in thermal communication with the tire so that it can determine the temperature of the medium in the tire. For example, the temperature sensor may be disposed such that it can determine the temperature of the medium which is in a region wherein a pressure is increased compared to a pressure outside the tire, in the valve or valve stem, for example. For example, the temperature sensor can be thermally connected to the medium by a material with high thermal conductivity, 90 W (m·K) to 500 W (m·K), for example 120 W (m·K), and may be formed of brass or steel. The valve may effect this thermal connection, and the valve itself may be formed of brass or steel.

Alternately, the temperature sensor can be disposed on or outside a valve of the tire. In some further exemplary embodiments, the temperature sensor can be formed together with the pressure sensor as one unit. In this way an installation can optionally be simplified because fewer components or even only one component can be mounted on the tire or in the valve. In other words, the temperature sensor can measure the temperature on the valve which is influenced by the temperature of the medium in the tire, so that a conclusion can be made regarding a temperature of the medium in the tire.

In other embodiments the device may includes a second temperature sensor, instead of or in addition to the first temperature sensor, configured to generate the second temperature signal. This temperature sensor is referred to as a "second temperature sensor" to distinguish it from the first temperature sensor and it is located outside the tire.

An outer region of the tire can be a region wherein the pressure of the medium (e.g., ambient air) is lower than the pressure in the tire. In other words the temperature sensor is disposed such that it can measure or determine an ambient temperature. A temperature measurement of the temperature sensor of a temperature in an interior of the tire, wherein the pressure is increased, can possibly only be influenced by a small amount, of approximately 10%. For example, the temperature sensor can be disposed on a rim of the tire, for example, using at least one of the wheel (lug) nuts. The temperature sensor can optionally be attached to a flat component (metal plate), which can be attached or screwed to the rim using the wheel nuts. Since the device of the present disclosure can include its own temperature sensor, it can detect a pressure change independently of the vehicle or vehicle control system, that is, when the vehicle or a vehicle control system is switched off and cannot provide a temperature signal. In other words, the first and the second temperature sensor can be disposed on the wheel, but at different locations. Here the first temperature sensor is positioned to measure or determine a temperature which is influenced as strongly as possible by the temperature of the medium in the tire, or even is the temperature of the medium in the tire, while the second temperature sensor is located to measure, for example, an ambient temperature that is influenced as little as possible by a temperature of the tire or the brakes.

In some further exemplary embodiments, the first temperature signal includes a plurality of data or measured values of a first temperature. Individual data elements can be provided at time intervals, and a plurality of measurements can be carried out over a certain period of time. The second temperature signal can also optionally include a plurality of data comprising information or measured values of the second temperature. In other words, measured values of the first and of the second temperature can be recorded for a plurality of points in time, and a plurality of measurements can thus be carried out. The pressure signal can also include a plurality of data about a pressure. In other words, the pressure can be measured more than once at different points in time. Since a plurality of successive measurements of pressure and temperature are carried out, a pressure change in the tire can be detected by comparing a pressure at a first point in time to a pressure at a second point in time. For example, the pressure, the first temperature, and/or the second temperature can each be measured at a common point in time. In this way it can be determined at what temperature the pressure is measured.

In some further exemplary embodiments, the processor is configured to generate an evaluation signal that comprises a data element or unit of information about a normalized pressure. For example, the pressure may normalized with respect to a unit of information about the temperature which is at least one of the temperature signals for a substantially identical measurement time or comprised in the same time interval. In other words, the device measures the tire pressure and, in addition, a corresponding temperature, and the measured pressure is converted or standardized or normalized, in the context of the measured temperature, to a reference pressure for a reference temperature. Since a plurality of pressure- and temperature-measurements may be carried out, a pressure change can be detected by a comparison of two different measured values. Furthermore, for example, an interpolation can be carried out based on a plurality of measured values. The result of the interpolation can be compared to a limit, for example a limit value for a permissible pressure gradient (e.g. pressure). In other words, a slope of the interpolated line can be observed; if this falls above a certain limit value, it can be concluded that there is a leakage. If the interpolation suggests that the pressure can decrease further and below a certain limit value, it can be concluded therefrom that there is a leakage. As a result, a corresponding warning can be issued to a driver.

Exemplary embodiments relate to a method for detecting a pressure change of a tire. In the method a first temperature signal is received which includes information about a first temperature, and a second temperature signal is received which includes information about a second temperature. A pressure signal is also received which includes information about a pressure of the tire. The information about the first temperature is subsequently compared to the information about the second temperature. The information about the pressure of the tire is subsequently evaluated depending on the comparison. An evaluation signal is subsequently generated which includes information about a pressure change in the tire. In other words, it can be determined whether optimum measuring conditions are present for a tire. For this purpose, a tire pressure and a first temperature near the tire, and a second temperature outside the tire or an ambient temperature can be measured. The measured pressure can be normalized, depending on the temperature measured with the pressure, to a reference temperature. For example, the reference temperature can be 25° C. The normalized pressure or a value for the normalized pressure can be stored in a memory unit, optionally including a time stamp. The measured pressure value under optimum measuring conditions can also be stored in a memory unit. If a sufficient number of measured values is available, the device can optionally determine a pressure change for a certain time, and the result can be compared to a limit value. If an expected pressure change is greater than a predetermined limit value, a corresponding warning can optionally occur, or a signal can be output.

BRIEF DESCRIPTION OF THE DRAWINGS

Further advantageous designs are described in more detail below with reference to the exemplary embodiments depicted in the drawings, but not limited to the exemplary embodiments.

The Figures thus schematically show the following views.

DETAILED DESCRIPTION

Figure 1:
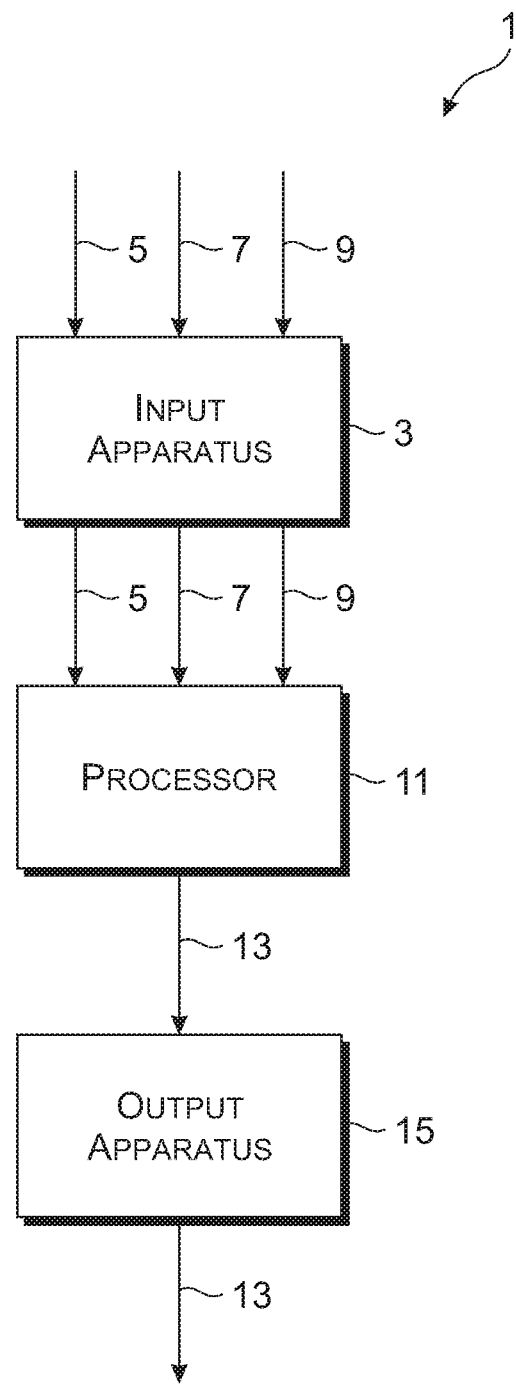
FIG. 1 is a schematic depiction of a device for detecting a pressure change in a tire.

In the following description of the accompanying Figures, like reference numerals refer to like or comparable components. Furthermore, summarizing reference numerals may be used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIG. 1 shows a device 1 that comprises an input apparatus 3. The input apparatus 3 is configured to receive a first temperature signal 5 which includes information about a first temperature, a second temperature signal 7 which includes information about a second temperature and a pressure signal 9 which includes information about a pressure. The device 1 further comprises a processor 11 that is configured to evaluate the information about the pressure of the tire in view of the information about the first temperature and the information about the second temperature. Based on the evaluation of the information about the pressure of the tire, an evaluation signal 13 is generated that includes information about a pressure change in the tire. The device further comprises an output apparatus 15 configured to provide the evaluation signal 13.

Figure 2:
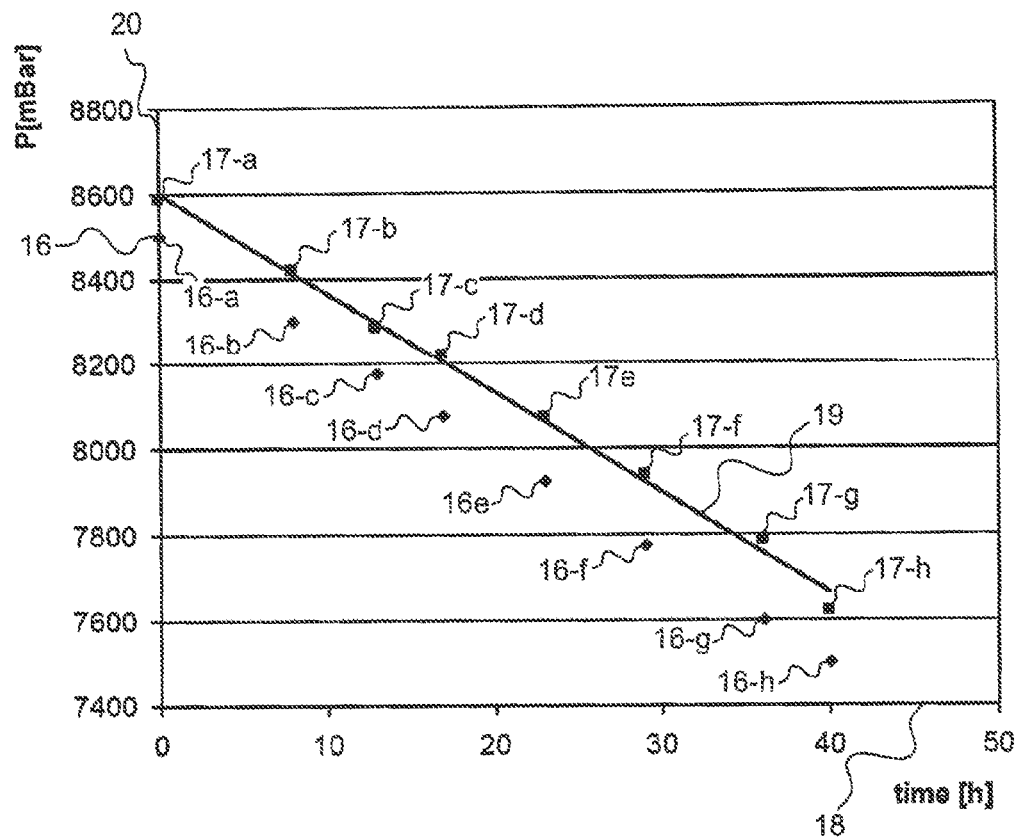
FIG. 2 is a graph of exemplary measured pressure values at different points in time for use in detecting a pressure change according to an embodiment.

FIG. 2 shows a schematic depiction of a graph on which measured pressure values according to an exemplary embodiment are plotted for detecting a pressure change with respect to time.

In the graph of FIG. 2, time values are plotted along an X-axis 18 in the unit h, hours, for example. The pressure is plotted along a Y-axis in the unit mBar. The graph of FIG. 2 shows measured values which might result if a slow leak, i.e. a pressure change below a limit value, is present. In the exemplary embodiment of FIG. 2, a leakage rate or a pressure change is −25 mBar/h.

In the diagram of FIG. 2, three different sets of values are graphed. A first data set 16 comprises eight measured pressure values 16-$a$ to 16-$h$ determined for different measurement points in time. The measured pressure values 16-$a$ to 16-$h$ represent the measured values without scattering/dispersion/spread, and the x and y values of the first data set 16 lie generally along the line characterized by the equation y=−23.386x+8601. A second data set comprises eight measured pressure values 17-$a$ to 17-$h$, which are drawn with a scattering or taking into account a scattering with respect to the X-axis 18. The scattering may arise from the presence of non-ideal measuring conditions, caused, for example, by sunlight, residual heat in the wheel, etc. The curve 19 results from the interpolation of the measured values 17-$a$ to 17-$h$ with the scattering.

In order to determine the measured values for the graph of FIG. 2, an optimum measurement phase or optimum measuring conditions were first determined. For this purpose a stoppage of the tire and/or of a vehicle can optionally be determined. This may be done, for example, by waiting to take pressure measurements until a certain period of time after the vehicle has stopped moving. This time interval may be referred to as cool-down time. Additionally or alternatively a tire temperature can be determined, or a temperature of the medium in the tire whose pressure is to be measured. The ambient temperature can also be determined, for example, using a further temperature sensor on the vehicle and/or on the tire.

After the measurement of the pressure, the measured pressure value can optionally be standardized or normalized with respect to the temperature measured with the pressure. In this way an influence of the ambient temperature (e.g. day and night) on the measurement can optionally be minimized. The normalization can, for example, be carried out based on the ideal gas equation:

$$PV=nRT \text{ wherein}$$

P pressure of the medium in the tire
V volume of the medium
T temperature of the medium
n number of particles
R ideal gas constant In the present exemplary embodiment, a pressure Pt25 is the normalized pressure at a temperature of 25° C. (298 K). PMEAS is the measured pressure with the temperature TMEAS measured with the pressure. For the following calculations, for example, a constant tire volume can be assumed:

$$PT25/PMEAS=T25/TMEAS,$$

and it follows that $$PT25=PMEAS*T25/TMEAS$$

In one exemplary embodiment, for example, the following can apply:
PMEAS=8000 mBar
TMEAS=5° C.
For this exemplary embodiment, a normalized pressure results of:

$$PT25=8000 \text{ mBar}*298 \text{ K}/278 \text{ K}=8575 \text{ mBar.}$$

In order to minimize the generation of false warnings or incorrect measured values, it may be desirable to obtain many measurement points in a given time interval. For example, eight measurement points can be determined in a time interval which is between 20 and 50 hours, for example more than 48 hours, after the tire has been stationary for 20 hours. Optionally, with a longer stationary phase of the tire or of the vehicle, the measurement points in time can be determined in shorter measurement intervals. That is, after the tire has been stationary for a long time, it can be assumed that its temperature has stabilized. A time interval between the measurement points can be, but need not necessarily be, constant.

After normalizing the measured pressure values with respect to the temperature of the medium in the tire, the measured pressure curve can be interpolated. For this purpose an interpolation algorithm, for example the least squares method (least squares estimation) can be used. This interpolation method may be suitable for placing a line through the measured values 17-$a$ to 17-$h$ and estimating an evolution of the pressure in the tire. In the exemplary embodiment of FIG. 2, the curve 19 thus results.

As an example, the measured pressure values can be processed or interpreted as follows:
Measured pressure values can be, for example: (P1, t1), (P2, t2) . . . . (Pn, tn)
where:
Px is the measured and normalized pressure
tx is the time of measurement
The result of the interpolation is: P=P0+P1*t.
The values for P0 and P1 can be derived using the following equation:

$$F(P0,P1)=[P1-(P0+t1*P1)]2+[P2-(P0+t2*P1)]2+ \ldots +[Pn-(P0+tn*P1)]2$$

Calculating the derivatives δF/δP0, δF/δP1 and equating the two derivatives with zero results in a system with two equations which can be solved for P0 and P1. P1 is the slope of the pressure curve or the line 10.

These parameters can optionally be compared to a limit value Pls, and if P1>Pls, this indicates the likely presence of a slow leak.

Figure 3:
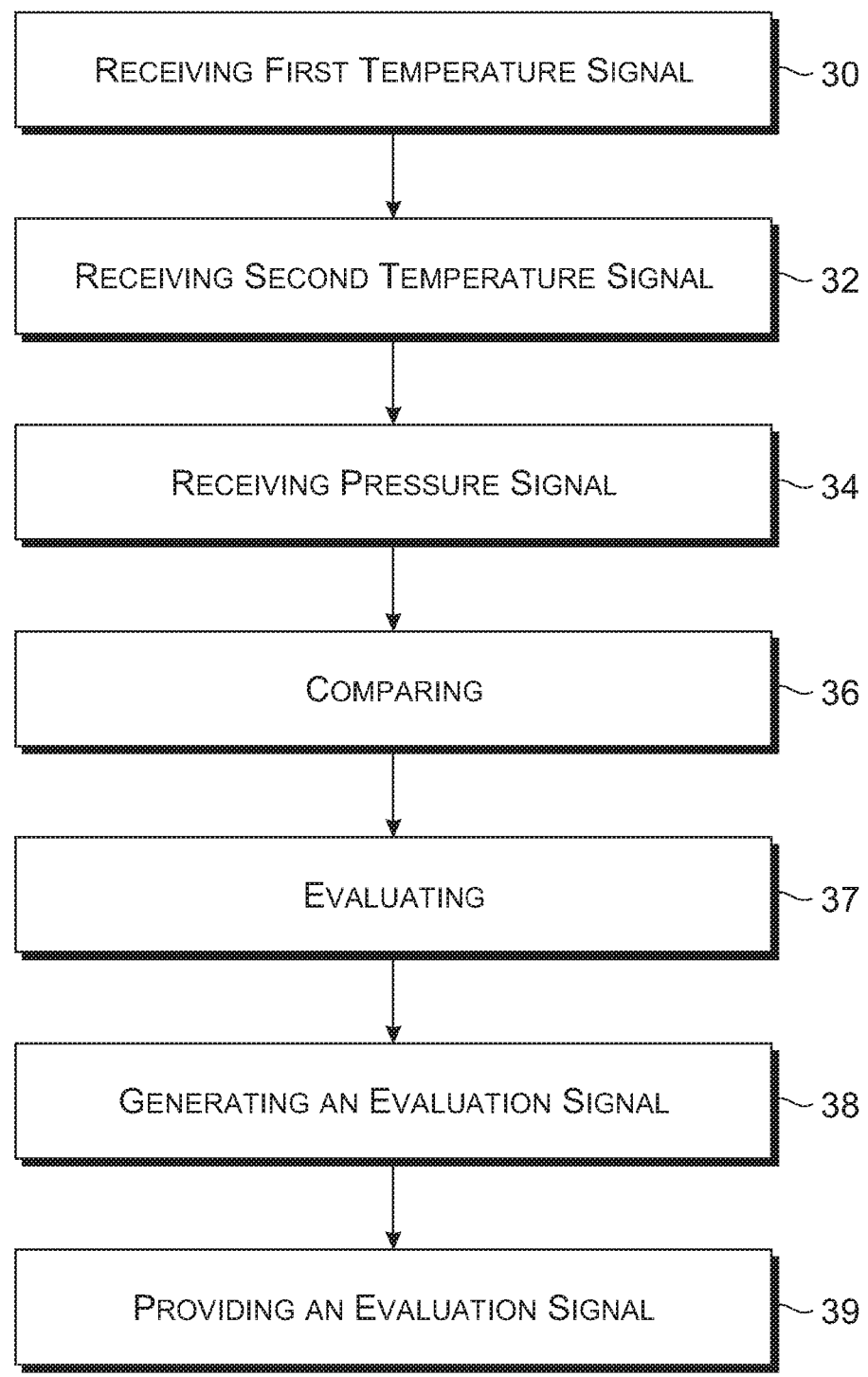
FIG. 3 is a flow chart depicting a method for detecting a pressure change in a tire according to an embodiment.

FIG. 3 schematically depicts a method for detecting a pressure change in a tire. This method includes receiving a first temperature 30, and receiving a second temperature signal 32 that includes information about a second temperature, and receiving a pressure signal 34 that includes information about a pressure of the tire. The information about the first temperature and the information about the second temperature are compared at 36. The information about the pressure of the tire is evaluated at 37 depending on the outcome of the comparing at 36. Furthermore, an evaluation signal is generated 38, which includes information about a pressure change in the tire. This evaluation signal is provided at 39.

The device 1 or the method described according to the exemplary embodiment can be used, for example, on one or more wheels of a truck. Alternatively, the device 1 or the method can also be used in the wheels of another vehicle, for example a motor vehicle, a trailer, a construction vehicle, or agricultural equipment.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Device
3 Input apparatus
5 First temperature signal
7 Second temperature signal
9 Pressure signal
11 Processor
13 Evaluation signal
15 Output apparatus
16 Measured pressure value with scattering
17 Measured pressure value without scattering
18 X-axis
19 Line
20 Y-axis
30 Receiving first temperature signal
32 Receiving second temperature signal
34 Receiving pressure signal
36 Comparing
37 Evaluating
38 Generating an evaluation signal
39 Providing an evaluation signal

We claim:

1. A device for detecting a pressure change in a tire, the device comprising:
an input apparatus configured to receive a first temperature signal including information about a first temperature, a second temperature signal including information about a second temperature, and a pressure signal including information about a pressure of the tire;
wherein the first temperature signal is generated by a first temperature sensor which is disposed outside the tire;
a processor configured to evaluate the information about the pressure of the tire based on the information about the first temperature and the information about the second temperature, and to generate an evaluation signal based on the evaluation of the information about the pressure of the tire, the evaluation signal including information about a pressure change in the tire; and
an output apparatus configured to provide the evaluation signal, and wherein
the processor is configured to evaluate the pressure signal only if a temperature difference between the first temperature and the second temperature is smaller than a predefined limit value.

2. A device for detecting a pressure change in a tire, the device comprising:
a first temperature sensor located outside the tire, the first temperature sensor being configured to produce a first temperature signal indicative of a first temperature;
an input apparatus configured to receive the first temperature signal from the first temperatures sensor, and to receive a second temperature signal from a second temperature sensor, the second temperature signal being indicative of a second temperature, and to receive a tire pressure signal from a tire pressure sensor, the tire pressure signal being indicative of a tire pressure of the tire; and
a processor configured to output an evaluation signal including information about a change of tire pressure based on the pressure signal and the first temperature signal and the second temperature signal, and wherein
the processor is configured to output the evaluation signal only after a difference between the first temperature and the second temperature is less than a predetermined difference.

3. The device according to claim 2, wherein the evaluation signal is based on a plurality of tire pressure signals from the tire pressure sensor, the plurality of tire pressure signals being taken during an evaluation time period, the evaluation time period beginning after a difference between the first temperature and the second temperature becomes less than a predetermined value.

* * * * *